United States Patent
Chen (10) Patent No.: US 10,047,706 B2
(45) Date of Patent: Aug. 14, 2018

(54) TURBOCHARGER AIR INTAKE WITH LOW-PRESSURE DROP AND CONTROLLED VACUUM AT A CRANKCASE INLET

(71) Applicant: S & B Filters, Inc., Fontana, CA (US)

(72) Inventor: Pilun A. Chen, Fontana, CA (US)

(73) Assignee: S&B Filters, Inc., Fontana, CA (US)

( * ) Notice: Subject to any disclaimer, the term of this patent is extended or adjusted under 35 U.S.C. 154(b) by 421 days.

(21) Appl. No.: 14/791,092

(22) Filed: Jul. 2, 2015

(65) Prior Publication Data

US 2017/0002777 A1    Jan. 5, 2017

(51) Int. Cl.
| F02B 25/06 | (2006.01) |
| F02M 35/10 | (2006.01) |
| F02M 25/06 | (2016.01) |
| F01M 13/02 | (2006.01) |

(52) U.S. Cl.
CPC .... *F02M 35/10262* (2013.01); *F01M 13/022* (2013.01); *F02M 25/06* (2013.01); *F02M 35/10111* (2013.01); *F02M 35/10157* (2013.01); *F02M 35/10222* (2013.01); *Y02T 10/121* (2013.01); *Y02T 10/144* (2013.01); *Y02T 10/146* (2013.01)

(58) Field of Classification Search
CPC combination set(s) only.
See application file for complete search history.

(56) References Cited

U.S. PATENT DOCUMENTS

| 3,161,187 A | 12/1964 | Parker |
| 4,173,878 A | 11/1979 | Nemets et al. |
| 5,140,968 A | 8/1992 | Doan |
| 5,611,204 A * | 3/1997 | Radovanovic ......... F02M 26/19 123/574 |
| 5,669,366 A | 9/1997 | Beach et al. |
| 5,974,802 A | 11/1999 | Blake |
| 7,431,023 B2 | 10/2008 | Kavanagh et al. |
| 7,721,530 B2 | 5/2010 | Holm |
| 7,886,727 B2 | 2/2011 | Ulrey et al. |
| 8,047,185 B2 | 11/2011 | Ulrey et al. |
| 8,453,626 B2 | 6/2013 | Holm |
| 8,739,823 B2 | 6/2014 | Van Haaren et al. |
| 2014/0014080 A1 | 1/2014 | Beshay et al. |
| 2014/0069399 A1 | 3/2014 | Eckard et al. |
| 2014/0130764 A1* | 5/2014 | Saumweber .......... F02B 29/045 123/184.21 |
| 2014/0238364 A1 | 8/2014 | Beyer et al. |

* cited by examiner

*Primary Examiner* — Lindsay Low
*Assistant Examiner* — Ruben Picon-Feliciano
(74) *Attorney, Agent, or Firm* — Stetina Brunda Garred & Brucker; Lowell Anderson (57) ABSTRACT

An intake tube has an inner and outer curved surface adjacent a turbocharger. A crankcase hose connects to the inner curved surface at a hose opening. Upstream ends of first and second struts straddle the hose opening and extend between and connect to the inner and outer curved walls. The struts have an oval-shaped cross section with a larger upstream end that forces air between the two struts and between each strut and the adjacent tube wall to create a low pressure at the hose opening to draw gases from the hose into the intake and turbocharger.

26 Claims, 8 Drawing Sheets

Fig. 31

TURBOCHARGER AIR INTAKE WITH LOW-PRESSURE DROP AND CONTROLLED VACUUM AT A CRANKCASE INLET

BACKGROUND

Current air inlets for turbochargers have a tube with a filter at the upstream end and a downstream end connected to the turbocharger for a motor vehicle engine. If the air inlet tube is curved just before the turbocharger a low pressure area can be created along the inside of the bend just before the turbocharger. A hose may connect this low pressure location on the air inlet to a crankcase in order to draw fumes from the crankcase through the tube and into the air inlet tube so the fumes may be burned in the engine. The pressure at the location where the hose outlet connects to the air inlet tube has to be lower than the pressure inside the crankcase in order to draw crankcase fumes into the air inlet and engine. The pressure in the hose or at the connection of the hose and the air inlet is monitored and if the pressure falls outside of specified parameters an engine control module will store a diagnostic trouble code and a check engine light may be lit.

Prior art designs place a movable venturi plug inside the air inlet tube and move the venturi plug along the axis of the inlet tube to vary the flow through the tube and indirectly to vary the vacuum on the opening of the crankcase hose adjacent the venturi plug. Such a design is described in U.S. Pat. No. 7,886,727 to Ulrey. But the venturi plug blocks a significant portion of the air inlet tube at the center of that tube, resulting in an undesirable pressure drop along the length of the inlet tube. It is desirable to minimize the pressure drop along the inlet tube in order to increase the volume of flow through the inlet tube and turbocharger. If the variable venturi is replaced with a typical open throat venturi the cross-sectional area reduction and flow restriction are still undesirable and the venturi flow is affected by the opening of the crankcase hose at or adjacent to the venturi. There is thus a need for an improved way to maintain the pressure or suction at the juncture of the crankcase hose and air inlet tube while achieving a low pressure drop in the air inlet tube.

Prior art designs also placed a venturi in the crankcase ventilation hose in order to draw vapors from the crankcase to the engine, as in published application US 2014/0014080 to Beshay. But such designs require a complex crankcase ventilation hose, require complex controls for the venturi and are still subject to pressure variations in the air inlet tube to ensure sufficient pressure drop across the venturi in the crankcase hose to operate correctly. There is thus a need for an improved and simpler way to maintain the pressure at the juncture of the crankcase hose with and air inlet tube.

BRIEF SUMMARY

An intake tube for an engine has an inner and outer curved surface adjacent a turbocharger. A crankcase hose connects to the inner curved surface at a hose opening. Upstream ends of first and second struts straddle at least part of the hose opening and extend between and connect to the inner and outer curved walls. The struts have an oval-shaped cross section with a larger upstream end that forces air between the two struts and between each strut and the adjacent tube wall. The flow around the struts creates a low pressure at the hose opening to draw gases from the hose into the intake and turbocharger.

A low pressure area is created by two parallel struts extending across the air inlet tube preferably on opposing sides of the centerline of the tube, with the crankcase tube preferably located between the struts and preferably where the distance between the struts is smallest and with the struts preferably located at a bend just before the turbocharger. The low pressure effect from the twin struts is believed to reduce pressure loss while maintaining the vacuum pressure at the juncture with the crankcase hose within specified parameters. The twin strut design creates an area of high velocity, low pressure airflow between the struts where the crankcase hose joins the air inlet tube. Each of the twin struts has an airfoil design having an oval cross-section that is larger at the upstream end and smaller at the downstream and preferably has curved upstream and downstream ends so as to increase the velocity of air flowing between the struts and reduce the pressure between the struts, and to reduce the aerodynamic drag and/or pressure differential from the air upstream of the struts to the air downstream of the struts.

Instead of reducing the entire diameter of the inlet to form a venturi the two struts extend across the intake tube diameter and separate the flow through the tube into three flow paths, forcing the air to go in between the two struts in a central path along centerline of the intake tube's flow path and around the two struts to form two side-paths with each side-path located between a sidewall of the intake tube and the adjacent strut. The struts are shaped in a way to force the air to increase in velocity as it travels between the two struts, with the oval-shaped cross section larger on the upstream end and narrower on the downstream end. The struts straddle the opening of the crankcase hose so crankcase vapors flow primarily if not entirely between the struts. Due to Bernoulli's principle, because the air increases in speed between the struts it also decreases in pressure as it travels between the two struts creating a vacuum at the opening of the crankcase hose to draw crankcase fumes into the air inlet between the struts. The struts may be configured to create a designed vacuum or negative pressure at the juncture of the crankcase hose and the air inlet tube. The shape of the struts also maximizes the pressure downstream of the two struts in order to minimize the total pressure loss through the air inlet tube. Thus, the design reduces the total pressure differential through the air intake tube while maintaining a specified vacuum at the connection of the crankcase hose with the air inlet tube.

In more detail, there is provided an air inlet for a turbocharger for a motor vehicle engine has a tube forming the air inlet where the tube has upstream and downstream ends with a curve adjacent the downstream end. The curve forms an inside curve and an outside curve on opposing sides of the tube. The tube has a centerline. First and second struts extend between and connect to the inside curve and the outside curve of the air inlet tube. Each strut is located on an opposing side of the centerline and separated from an adjacent wall of the inlet tube. Each strut has an upstream edge larger than a downstream edge and is configured to separate the flow through the tube into a first flow path between the struts and along the centerline, a second flow path between one strut and the wall of the inlet tube adjacent that one strut and a third flow path between the other strut and the wall of the inlet tube adjacent the other strut. The struts are configured to increase the speed of fluid flow along the first flow path along the centerline between the struts. The intake tube also has connector fitting having an opening in fluid communication with the inside of the inlet tube at a location that is at least partially between the first and second struts and sufficiently close to the struts so that the increase in speed along the first flow path causes a reduction in pressure at the opening of the connector fitting.

In further variations, the air inlet the upstream edge of each strut may have a curved surface with an upstream apex and sides extending downstream. The trailing edge of each strut may have a curved surface with a downstream apex and sides extending upstream. The cross-sectional shape of each strut is preferably an oval with straight lines connecting the upstream and downstream edges and with the oval shape extending along substantially the entire length of each strut. Further, each strut is advantageously configured to increase the flow rate of fluid or speed of fluid as it passes along the second and third flow paths parallel to the centerline. Advantageously, the connector fitting has a majority of the opening located between the struts where the distance between the struts is the narrowest. Preferably, the connector fitting has an inner diameter Di and the struts have facing sides spaced apart a distance about Di or slightly larger at the closest point of the adjacent struts. For struts with rounded leading edges the closest location between the two struts occurs at the juncture of the leading edge with the side joining the leading and trailing edges, as the downstream portion of the struts usually separate thereafter and are usually spaced further apart. Thus, if the leading edge is a semicircle the juncture of that semicircle with the side marks the closest point and the struts are separated by a distance of about Di at that closest point. The connector fitting is preferably connected to a hose in fluid communication with a motor vehicle crankcase. The sides may be further denoted as the outer sides and the inner sides. The outer sides face the adjacent wall of the tube and the inner sides face the distant wall of tube and also face the adjacent wall of the adjacent strut.

The air inlet for a turbocharger for a motor vehicle engine may also include a tube forming the air inlet where the tube has upstream and downstream ends with a curve adjacent the downstream end. The curve forms an inside curve and an outside curve on opposing sides of the tube. The tube has a wall and a centerline with first and second struts extending between and connecting to the inside curve and the outside curve of the air inlet tube. Each strut is located on an opposing side of the centerline and separated from an adjacent wall of the inlet tube. Each strut has an upstream edge larger than a downstream edge and is configured to separate air flow through the tube into a first flow path between the struts and along the centerline, a second flow path between the first strut and the wall of the inlet tube adjacent the first strut and a third flow path between the second strut and the wall of the inlet tube adjacent the second strut. The first and second struts are configured to increase the velocity of air flowing along at least the first flow path between the struts. The tube further has a connector fitting having an opening in fluid communication with the inside of the inlet tube at a location that is between the first and second struts and adjacent the upstream edge of the struts and a wall of the tube to which the struts are connected so that the increase in velocity along the first flow path causes a reduction in pressure at the opening of the connector fitting.

In further variations, the upstream edge of each strut may have a curved surface with an upstream apex with the curved surface extending downstream from that apex. The trailing edge of each strut may also have a curved surface but with a downstream apex. The cross-sectional shape of each strut is preferably an oval with straight sides connecting the upstream and downstream edges, with the oval shape extending along substantially an entire length of each strut. Each strut is preferably configured to also increase the velocity of airflow as it passes along the second and third flow paths parallel to the centerline. The opening to the connector fitting preferably has a majority of the opening located between the struts and downstream of the upstream edge of the strut. The connector fitting may be connected to a hose in fluid communication with a motor vehicle crankcase.

There is also provided an air inlet for a turbocharger for a motor vehicle engine where a tube forms the air inlet. The tube has upstream and downstream ends joined by a wall defining a flow path and having a centerline. First and second struts extend from a first side of the tube along a straight length of each strut toward an opposing side of the tube. Each strut is located on an opposing side of the centerline and separated from an adjacent wall of the inlet tube. Each strut has an upstream edge and a downstream edge and is configured to separate air flow through the tube into a first flow path between the struts, a second flow path between the first strut and the wall of the inlet tube adjacent that one strut and a third flow path between the other strut and the wall of the inlet tube adjacent the other strut. The struts have a maximum thickness adjacent the upstream edge and a smaller thickness at the downstream edge to increase the velocity of airflow along the first flow path between the struts at the wall between the struts. An opening in the wall between the first and second struts is in fluid communication with an inlet fitting extending outward from the tube.

In further variations each strut may extends a length L which is shorter than the distance to the opposing wall of the tube so that each strut is cantilevered from the wall of the tube from which the strut extends. Advantageously, each strut does not extend past the centerline of the tube. Each strut may have a circular cross section. Each strut may also extend between and be connected to opposing sides of the wall of the tube, and if so each strut is preferably hollow and more preferably may open onto an exterior surface of the tube at each end of the strut. Each strut may have an upstream edge curved in the direction of airflow along the centerline and a downstream edge curved in the opposing direction, both curved edges being joined by flat sides. The upstream edge is larger than the downstream edge.

In still further variations, the tube is curved so as to have an inner curve with a first radius of curvature and an outer with a second, larger radius of curvature. The first strut has its upstream edge curved in the direction of flow along the centerline and has a concave side facing the wall of the tube adjacent that concave side and facing toward the inner curve. The first strut has an opposing side that is convex and that joins the upstream edge and the trailing edge. The second strut has the upstream edge curved in the direction of flow along the centerline and has a convex side facing the wall of the tube adjacent that concave side and facing the outer curve. The second strut has an opposing side that is concave and that joins the upstream edge and the trailing edge of the second strut.

In still further variations, the upstream edge of each strut is curved in the direction of flow along the centerline and sides joining a downstream edge. Each strut may have an oval shaped cross-section with the upstream edge that larger than the downstream edge. The upstream and downstream edges may be joined by flat sides that are substantially parallel to each other.

The struts may have sides connect the upstream and downstream edges with the sides of each strut connecting the upstream edge at a juncture extending along a length of the strut so that a cross-sectional area of the first flow path in a plane through the junctures of facing sides the first and second struts is smaller than a cross-sectional area of the first flow path at the trailing edges of the first and second struts. The cross-sectional area of the second flow path along the juncture of the first strut and the adjacent wall of the tube is preferably larger than the cross-sectional area between the trailing edge of the first strut and the adjacent wall of the tube. The struts are configured to increase the velocity of air passing downstream of the juncture and before the air passes the trailing edges of the struts. The above variations, the opening advantageously has a diameter Di and the first and second struts are spaced apart a distance between about Di at the location of the juncture of each strut.

There is also provided a method for creating a low pressure area in an intake tube of a motor vehicle at the location of a hose opening in a wall of the intake tube. The intake tube has an inlet opening and an outlet opening with a curve therebetween. The curved portion of the tube has an inner curved surface and an outer curved surface opposite thereto. The method comprises the steps of drawing air into the inlet opening of the intake tube. The method further comprises drawing the air over first and second struts that extend between the inner and outer curved surfaces of the intake tube and located on opposing sides of a centerline of the intake tube and on opposing sides of the hose opening. The struts are configured to cause the speed of air to increase as it passes the struts along the centerline of the tube. The passing step causes air to flow between the two struts and to flow between each strut and an adjacent wall of the tube with sufficient speed to create a reduced pressure area at the location of the hose opening. The method also includes sucking vapor from the hose opening into the intake tube between the two struts. The method may also include passing the air and vapor to a turbocharger in fluid communication with the outlet end of the intake tube. In this method the struts may have an oval-shaped cross section.

BRIEF DESCRIPTION OF THE DRAWINGS

These and other features and advantages of the invention will become more apparent in light of the following discussion and drawings, in which like numbers refer to like parts throughout, and in which.

DETAILED DESCRIPTION

Referring to FIGS. 1-9, an air intake or air inlet tube 10 has an inlet end 12 and outlet end 14 and a centerline 16. The inlet end 12 typically connects to an air filter (not shown) and is configured accordingly to match the configuration of the air filter. The outlet end 14 typically connects to a turbocharger (not shown) and is configured accordingly to match the configuration of the turbocharger. The inlet tube 10 typically has a circular cross section and is usually made of a molded polymer, but the materials and construction will vary with the application. The inlet end 12 is usually the same diameter as the outlet end 14, or slightly larger in diameter or cross-sectional area than the outlet end 14. The inlet tube 10 is shown with a generally reversed "S" shape so the centerline 16 has two curves, with the upstream curve located adjacent inlet end 12 and the downstream curve located adjacent outlet end 14. The configuration of tube 10 will vary, but preferably there is at least one curve and that curve is preferably adjacent the outlet end 14. Depending on the application the intake tube 10 may have different fittings, bosses or shaped portions 18 to connect with different parts of the engine, vehicle or other device with which the tube 10 is used.

As used herein, the relative directions inner and outer refer to directions toward and away from centerline 16. The relative directions above, below, upper and lower refer to the relative directions when the intake tube 10 is in the orientation of FIGS. 1-6. The relative directions upstream and downstream are with respect to the upstream end 12 and downstream end 14 along the direction of centerline 16. As used herein each of the two curves in the tube 10 have an inside curved portion and outside curved portion, with the inside curve having the smaller radius of curvature and the outside curve having the larger radius of curvature and with both radii of curvatures having a common locus or very close loci.

It is common to have a slightly raised distal rib 20 around the exterior periphery of the tube 10 at the distal portion of ends 12, 14, with a similar rib 22 adjacent thereto so that a hose clamp (not shown) can encircle the ends 12, 14 to clamp the ends to mating parts during use of the tube 10.

Figure 1:
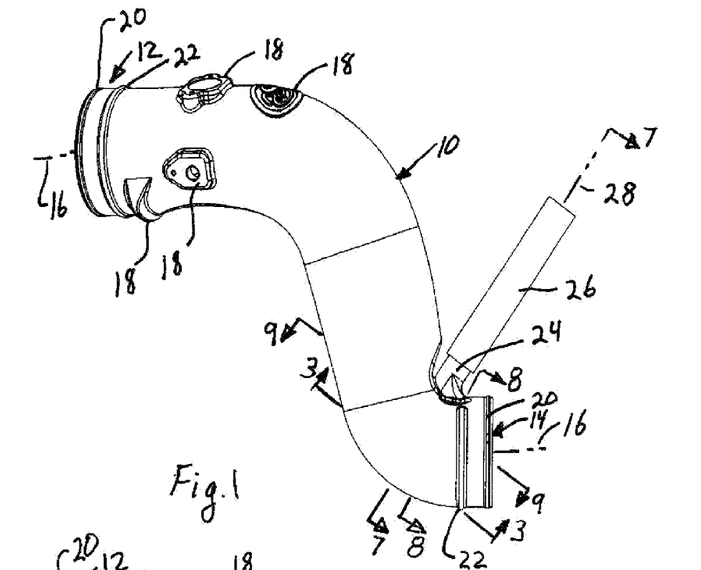
FIG. 1 is a side plan view of an air inlet tube and crankcase hose.
Figure 2:
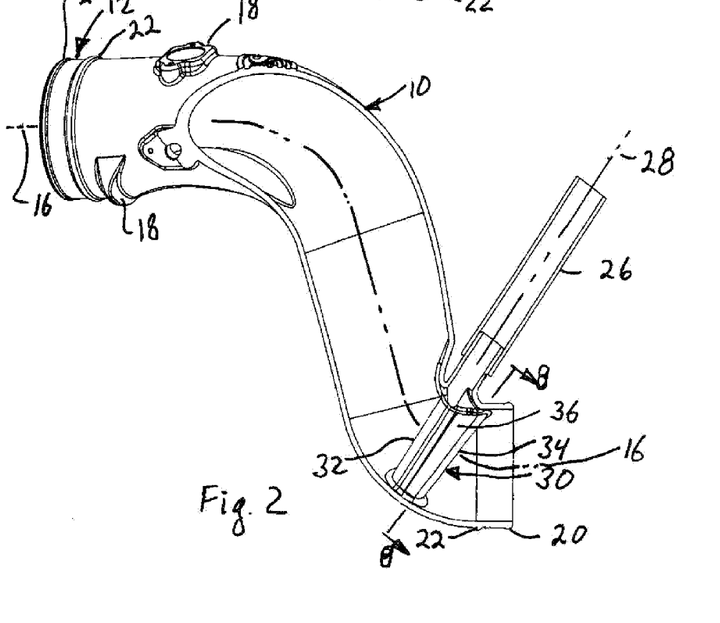
FIG. 2 is a partial sectional view of the air inlet tube of FIG. 1 taken along Section 2-2 of FIG. 4.
Figure 4:
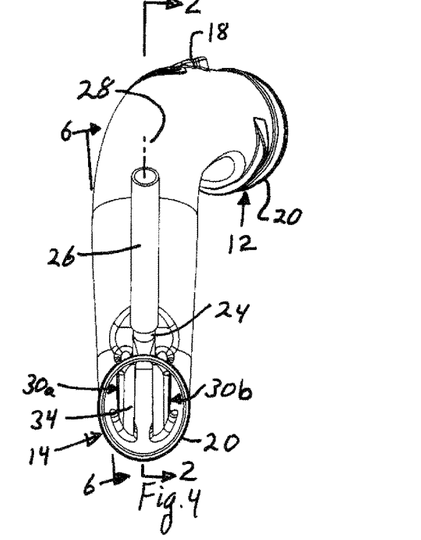
FIG. 4 is a right side plan view of the air inlet tube of FIG. 1.

As best seen in FIGS. 1-2, the inlet tube 10 has an outwardly extending, tubular connector fitting 24 adjacent the second end 14, which mates with an outlet end of crankcase hose 26 with the connector fitting opening onto the inside of the intake tube 10 at opening 27. The opposing end of the crankcase hose 26 is in fluid communication with the crankcase so crankcase vapors can be drawn through the hose 26 and connector fitting 24 and into the intake tube 10. The connector fitting 24 is located on the downstream curve of the intake tube 10 and on the inside curve adjacent the outlet end 14, preferably extending along a radii through the inside curve and outside curve and preferably extending along the central radii of those curves. But the exact location and orientation of connector fitting 24 can vary. The connector fitting is preferably a short, cylindrical tube integrally molded of polymer at the same time as the portion of tube 10 is molded which connects to fitting 24. The crankcase hose 24 is usually a flexible rubber or braided polymer hose that is not completely shown in FIGS. 1-6. The fitting 24 and hose 26 are shown as extending straight along fitting axis 28 (FIGS. 1, 2 and 4). The axis 28 preferably intersects the centerline 16 and preferably, but optionally the axis 28 is in a plane through centerline 16 which plane extends through the downstream curve of the centerline 16 and tube 10. The struts 30 are shaped to create a low pressure area at the juncture of the tube 10 with the connector fitting 24 and having a predetermined pressure range that typically varies with the flow rate through the tube 10. Advantageously the struts 30 are shaped so that the pressure at the opening 27 on the inside the inlet tube 10 for the connector fitting 24 is about the same as or slightly lower than the pressure in the crankcase hose 26. But the pressure may be adjusted as desired.

Figure 3:
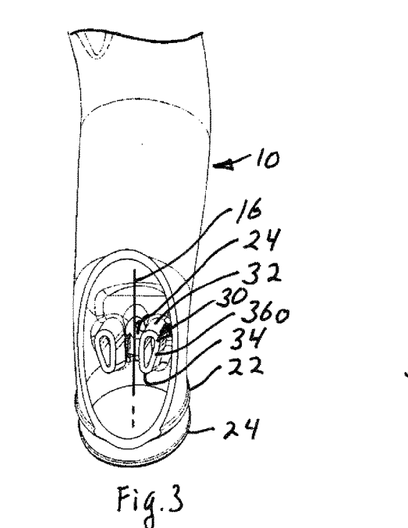
FIG. 3 is a partial sectional view taken along Section 3-3 of FIG. 2.
Figure 5:
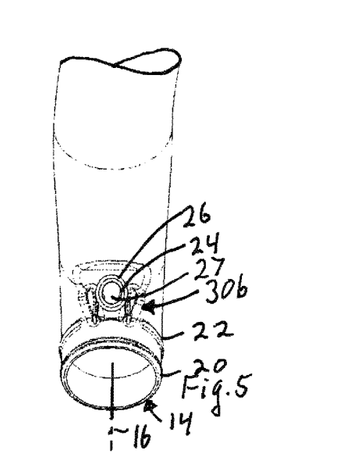
FIG. 5 is a partial plan view taken along the axis of the crankcase hose of FIG. 1.
Figure 7:
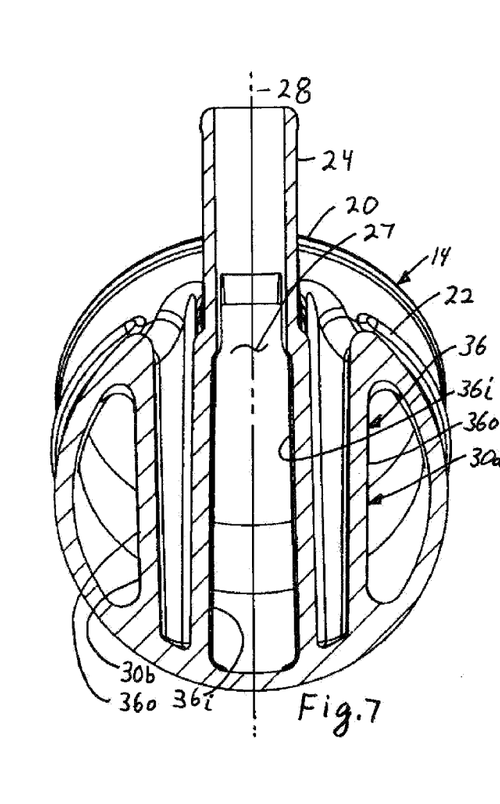
FIG. 7 is a cross-sectional view of the inlet tube taken along axis 28 and Section 7-7 of FIG. 1.
Figure 8:
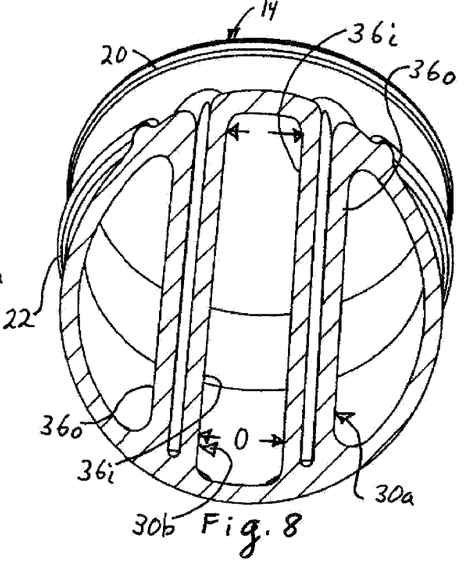
FIG. 8 is a cross-sectional view taken along Section 8-8 of FIG. 1, through the trailing edges of the struts
Figure 9:
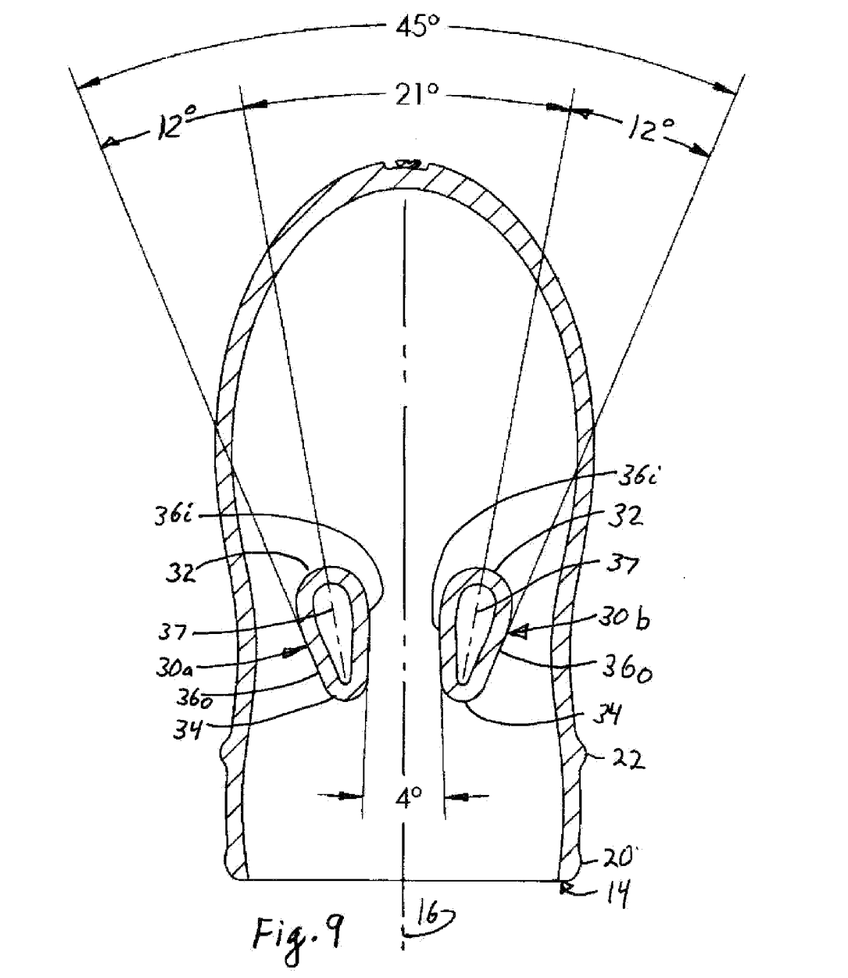
FIG. 9 is a sectional view showing the strut orientation, taken along Section 9-9 of FIG. 1.
Figures 10, 14, 15:
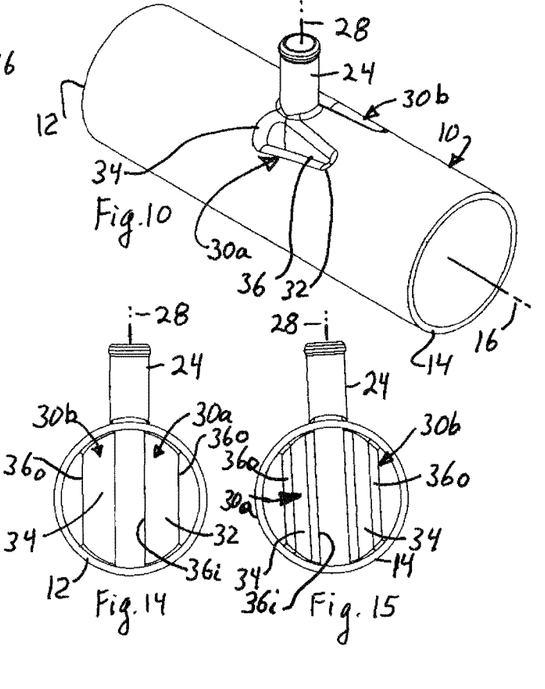
FIG. 10 is a perspective view of an embodiment showing a straight inlet tube with struts extending between and connecting to opposing walls of the tube.
FIG. 14 is a left side plan view of the tube of FIG. 12.
FIG. 15 is a right side plan view of the tube of FIG. 12.

Referring to FIGS. 3-9, two struts 30a, 30b extend between opposing walls of the tube 10 along a length of each strut. Each strut 30 has a width along the direction of airflow along centerline 16. Each strut 30 has a thickness in the direction perpendicular to the centerline 16 and perpendicular to the length of each strut. The struts 30 are located on opposing sides of the centerline 16 and of axis 28, and are preferably symmetric about a plane through the centerline 16 have an oval-shaped cross section and are preferably symmetric about a plane through axis 28 and centerline 16 through the downstream curve of the centerline 16 and tube 10. Each strut 30 is separated from the adjacent wall of the inlet tube 10. The struts 30a, 30b have the same shape but are preferably minor images of each other about the described plane. The oval-shaped cross-section has a larger upstream edge 32 and a narrower downstream edge 34 (FIGS. 3, 5, 9). The upstream or leading edge 32 of each strut 30 is curved in the convex direction relative to the direction of flow so the downstream flow is directed around the curved leading edge of each strut 30 and along a flat or straight side 36 which merges with the smaller curvature of the downstream edge 34. Alternatively phrased, the leading edge 32 has a curved surface with an upstream apex and sides extending downstream. The upstream edge 32 may also be described as curved in the direction of flow along centerline 16.

The downstream edge 34 faces the opposite direction as the upstream edge 36 and the edge 34. The downstream edge 34 thus has a curved surface a downstream apex and sides extending upstream. The curves are preferably a segment of a circle and more preferably about half a circle with the upstream edge 32 being larger in diameter than the downstream edge 34. As best seen in FIG. 2, the struts are larger along the flow direction adjacent the inside curve of the tube 10 and larger in cross section adjacent the inside curve of the tube 10 and smaller in cross-section and smaller in the direction of flow—adjacent the outside curve of the tube 10. As best seen in FIG. 9, each strut 30 has an axis 37 extending generally in the direction of flow with each strut 30 being generally symmetric about that flow axis 37. In the depicted embodiment the flow axis 37 is inclined at an angle of about 9-12° from the plane through centerline 16 and axis 28, and preferably at an angle of about 10.5°.

The two sides 36 of each strut 30 are shown as generally flat sides that taper from the rounded leading edge 32 toward the smaller, trailing end along a length of each side and toward the axis 37 of each strut at an angle of about 10-14° toward the downstream end of that axis, and preferably at an angle of about 12°. The total included angle of taper of both sides 36 of the same strut 30 is about 24°. This taper gives the strut its oval shape. The outward facing flat sides 36 of each strut 30, the side 36 facing the adjacent wall of the inlet tube 10, are preferably angled at about 45° with respect to each other, in an inclusive angle as seen in FIG. 9.

The taper on each of the struts 30 is designed to prevent turbulent boundary layer separation and to encourage air to smoothly merge together after it passes the strut and passes through the passageways formed by the struts 30. The angle of taper along the flow path in the direction of centerline 16 is preferably kept at a minimum so included angles closer to 22° are preferred and included angles as small as 20° are believed usable but not preferred.

The proximity of the struts 30 to the outlet of the inlet tube 10 may limit the taper angle since a smaller taper angle increases the distance between the leading edges 32 of the struts and the trailing edges 34 of the struts. The two flat sides 36 that face each other are closer together adjacent the inside curve and are further apart at the outside curve.

Still referring to FIG. 9, the leading and trailing edges 32, 34 of the two adjacent struts 30a, 30b taper away from each other at an angle of about 2 degrees for each edge, or a total divergence angle of about 4 degrees so the facing sides 36 are closer together at the upstream ends 32 and further apart at the downstream ends 34. The facing flat sides 36 diverge in the downstream direction. The divergence angle is relatively small, measured as a few degrees rather than tens of degrees, and preferably under ten degrees inclusive angle. The taper angle was chosen to reduce the taper convergence angle between the two flat sides 36 of each strut 30, while having minimal impact on the velocity of air between the two struts 30. If the taper angle between the leading and trailing edges 32, and 34 is too great, the air will slow down as the passageway between the struts expands, reducing the vacuum generated by the air in this passageway. The taper is designed to maintain the velocity of air between the two adjacent struts 30a, 30b, and should be such that the struts and the facing surfaces 36 are parallel or close to parallel.

Figure 6:
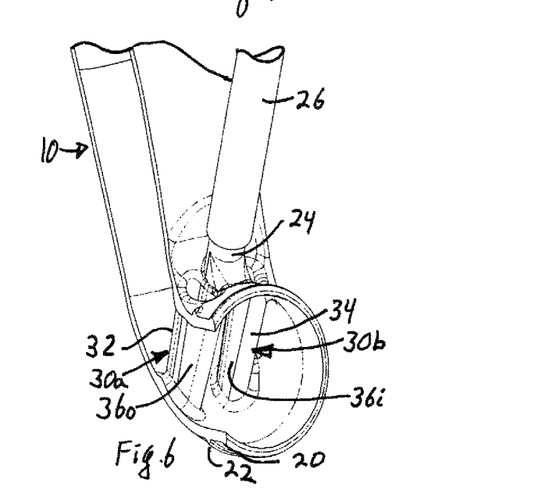
FIG. 6 is a partial sectional view taken along Section 6-6 of FIG. 4.

Referring to FIGS. 2 and 6, the struts are larger at the inside curve and smaller at the outside curve, when measured along the flow path generally parallel to along centerline 16. The taper along the length of the struts 30 that extends across the diameter of tube 10, is to allow a plug to be inserted and withdrawn for molding, and to account for the curvature of the tube 10 at the location where the struts are preferably located when the tubes 10 are curved. The plug for each strut is preferably inserted from the inside curve of the tubular inlet 10, as reflected by the cavity in FIGS. 6-9 which shows that the struts 30 are preferably hollow and preferably extend from the inside curve to the outside curved side of the inlet tube 10. The juncture of the opposing ends of each strut 30 with the interior wall of the inlet tube 10 has a fillet to reduce stress and present a smoother flow contour. A concave fillet of about 0.2 inches in diameter is believed suitable for a tube 10 having an inner diameter of about 3.6 inches at the location of the struts 30.

As best seen in FIGS. 2 and 9, the curved leading edge 32 may comprise a combination of curved and flat segments that continually narrow the cross-section in the downstream direction. Preferably, the side of the strut 30 has four lines between the leading and trailing edges and generally aligned with those edges, which lines extend from the inside curved wall of tube 10 to the outside curved wall. The upstream or leading edge 32 is curved and preferably semi-circular in the cross-section (FIG. 9) and the first line reflects the juncture of that curved leading edge 32 with a flat side which ends at the second line that represents a slightly curved surface joining the flat surface 36 the leading edge of which is the third line. The combination of flat and curved sides offers molding advantages while maintaining the Bernoulli effect of the struts 30.

As seen in FIGS. 2, 3 and 5, the opening 27 of the connector fitting 24 on the inside of the wall of the tube 10 is located at the upstream end or leading end of the struts 30. Advantageously the centerline 28 of the fitting 24 is extends between the facing flat sides 36 of the struts 36a 36b. Advantageously downstream end of the opening 27 in the wall of the tubular inlet 10 for the fitting 24 overlaps with the space between the two struts 30, and preferably the centerline 28 of the fitting 24 is located past the upstream ends of the two struts 30, and more preferably the centerline 28 is at or just past the juncture of the upstream edge 32 and flat side 36 of the struts, and preferably the downstream end of the opening 27 for the fitting 24 does not extend past the upstream ends of the struts 30.

The struts 30 divide the flow through the inlet tube 10 into three flow paths as best seen in FIGS. 7-8. The first flow path is between the two struts 30a, 30b and along the centerline 16. This first flow path has a generally rectangular cross-sectional shape centered on centerline 16 and bounded by the leading or upstream edges 32 of the struts and the two facing sides 36i of the two struts 30a, 30b, and the trailing or downstream edges 34 of the two struts. Because the struts 30 typically taper from the upstream edge 32 to the downstream edge 34 so the spacing between the facing flat portions 36i increases in the downstream direction, the first flow path is smaller in cross-sectional area at the upstream edge of the struts and larger in cross-sectional area at the downstream edge. Advantageously the connector fitting 24 has an inner diameter Di at the juncture with the wall of intake tube 10 and the flat surfaces 36 of struts 30a, 30b which face each other are preferably spaced apart a distance of about 1-1.5 Di and preferably a distance of about Di.

The struts 30 are configured to cause the velocity in this first flow path to increase as air flows between the struts and the increase in velocity causes a reduction in pressure which in turn reduces the pressure at the juncture with the connector fitting 24 and in the crankcase hose 26. The pressure at the juncture with connector fitting 24 and inside the fitting 24 may be varied by the configuration of the struts and the location of the connector fitting 24 between the struts and along the length of centerline 16. The strut cross-section, orientation in the tube 10 and spacing are thus advantageously-selected to take advantage of Bernoulli's principle and increase velocity of flow in the downstream direction as the flow passes the struts 30, thereby reducing pressure at a desired location between the struts.

For struts 30 with rounded upstream or leading edges 32 the closest location between the two struts 30a, 30b occurs at the juncture of the leading edge 32 with the side 36, as the trailing or downstream portion of the struts usually separate thereafter and are usually spaced further apart. Thus, if the leading edge 32 is a semicircle the juncture of that semicircle with the side 36 marks the closest point and the struts 30a, 30b are separated by a distance of about Di at that closest point. The sides 36 may be further denoted as the outer sides 36o and the inner sides 36i. The outer sides 36o face the adjacent wall of the tube 10 and the inner sides 36i face the distant wall of tube 10 and also face the adjacent wall 36i of the adjacent strut 36.

The second and third flow paths are semicircular in cross-sectional shape and comprise the area between the outer sides 36o of the struts 30a, 30b and the adjacent wall of the tube 10. The tube 10 preferably has a circular cross-section at the location of the struts 30 so the cross-sectional shape of the second and third flow paths is semi-circular along the inside of the tube with a straight cord along the side of the strut facing the tube. As best seen in FIGS. 7-8, the second and third flow paths are mirror images of each other, reflected along the plane of axis 28 and centerline 16 at the location of the struts. As the downstream edges 34 of the struts are further from the adjacent walls of the tube 10 than the upstream edges 32, the cross-sectional shape of the second and third flow paths are smaller at the upstream edge 32 and larger at the downstream edge 34, causing an increase in velocity along the direction of centerline 16.

Advantageously the cross-sectional area of second and third flow paths is the same at each location along the centerline 16 in a plane orthogonal to that centerline. Advantageously the cross-sectional area of the first flow path is greater than the cross-sectional area of either second or third flow paths taken alone, and about the same as or slightly larger than the cross-sectional area of the second and third flow paths combined, at each location along the centerline 16 in a plane orthogonal to that centerline. Advantageously the struts 30 block about 47% of the cross-sectional area of the intake tube 10 at the juncture of the leading edge 32 and flat sides 36, and block about 25% of the cross-sectional area of the tube 10 at the juncture of the trailing edge 34 and flat sides 36. In the illustrated embodiment, the cross-sectional area of the tube 10 just upstream of the struts 30 is about 10 sq. in. The cross-sectional area blocked by the struts at the juncture of the leading edge and flat sides is about 5 sq. in. The cross-sectional area of the flow through the tube 10 that is blocked by the struts 30 at the juncture of the trailing edge 34 and flat sides 36 is about 2.5 sq. in. Thus, the upstream edge of the struts 30 blocks about twice the area as the downstream edge of the struts.

The air inlet 10 and struts 30 are believed especially suitable for use with turbocharged diesel engines or other engines which lack a throttle body. The struts 30 are believed suitable with air inlets 10 carrying the air for vehicle engines, which typically range from about 20 cfm at idling, to 600 cfm or higher during maximum operation, for current diesel engines.

While the struts 30 create a localized low pressure area at a predetermined location in the tube 10, having a predetermined pressure range for a predetermined flow through the tube 10, the struts also reduce the flow loss through the inlet tube 10 needed to achieve that localized low pressure area. Because the cross-sectional area of the tube 10 that is blocked by the struts is relatively small, the pressure loss through the tube that is caused by adding the struts can be controlled. Since it is advantageous to reduce the pressure loss through the intake tube 10 and to increase the volume of flow through the tube 10, this ability to control the pressure loss and flow loss is very desirable. The struts 30 allow the intake tube 10 to reduce the pressure loss and reduction in flow that arises from creating a low pressure area at the juncture with the connector fitting 24, so the increased flow through the intake tube 10 results in increased engine performance.

Referring to FIGS. 1 and 2, the intake tube is preferably formed in segments that are connected together. The shape of the struts 30 is designed to minimize the obstruction to airflow along centerline 16 in order to minimize the loss of pressure as the air flows around the struts. The loss of pressure along the length of the inlet tube 10 is the difference in pressure of the air upstream of the struts 30 adjacent the leading edge 32 and the air downstream of the struts adjacent the trailing edge 34. The pressure of the air in between the two adjacent struts 30a, 30b is lower than either the pressure of the air upstream or downstream of the struts. The leading edges 32 of the struts 30 is preferably curved, more preferably round or oval, although any other streamlined shape may be used to reduce pressure loss. The corresponding, facing portions of each strut 30a, 30b along the length of the adjacent struts should be parallel or close to parallel in order to maintain air velocity as the air passes between the struts along the downstream direction of centerline 16.

The trailing edges 34 of the struts 30 facing away from the crankcase opening are also preferably curved or tapered at a shallow angle to encourage air to stay attached to those edges and flow along the surface forming those edges 34, which thereby reduces boundary layer separation and decreases drag and pressure loss to the airflow. Typically the angle on the trailing edge 34 should be kept as shallow as practical, however the length of the struts along the direction of centerline 16 will increase with a decreasing taper angle. The angle is selected to be as small as possible, while keeping the struts 30 within the curved portion of the intake tube 10, especially if the crankcase opening is close to the distal opening defined by the outlet end 14.

The struts 30 extend across the flow path through the tube 10 generally perpendicular to the airflow and perpendicular to the centerline 16 of the tube 10, with the struts preferably generally parallel to each other in the length direction, but generally separate from each other in in the downstream direction to increase the airflow velocity. The struts 30 may be inclined if desired and if inclined then preferably the end of the struts 30 on the inside curve trail the opposing end of the struts 30. Inclination angles of about four degrees are believed suitable, primarily for molding convenience, but with the perpendicular orientation believed ideal.

The location of the crankcase opening 27 is preferably positioned where the air is flowing with the highest velocity, which is also where the distance between the inner edges 32 of the struts 30 is at a minimum. This is approximately where the round leading edge 32 of the struts 30 meets with the inner sides 36 of the struts, on the inside curved portion of the wall of the intake tube 10. If the inner sides 36 of the struts 30 taper away from each other, it is preferred to place the crankcase opening 27 closer to the leading edge or upstream edge 32, rather than the trailing edge or downstream edge 34.

The inlet tube 10 is shown as having two curves with the struts 30 located at a curve, but the opening 27 and struts 30 need not be located at a curve and the intake tube may be straight. If the tube 10 is curved then it is preferred to place the struts 30 as generally described above, extending generally radially between the inner and outer walls of the tube forming the curve in the tube 10.

Figure 11:
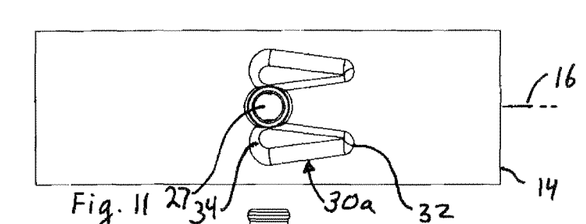
FIG. 11 is a top plan view of the tube of FIG. 10.
Figure 12:
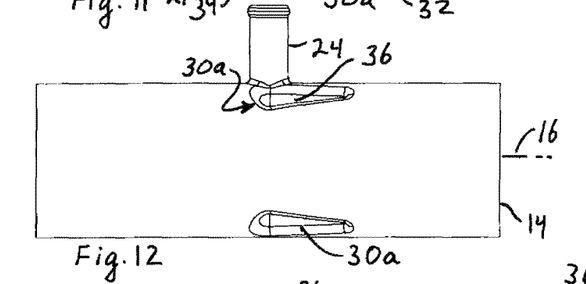
FIG. 12 is a side plan view of the tube of FIG. 11.
Figure 13:
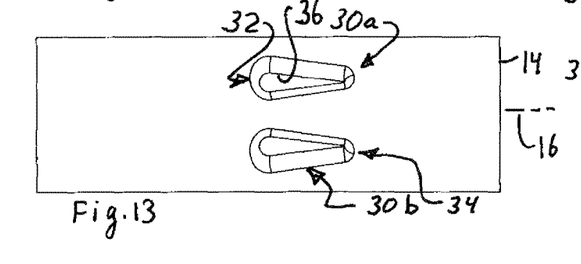
FIG. 13 is a bottom plan view of the tube of FIG. 11.
Figures 16, 20, 21:
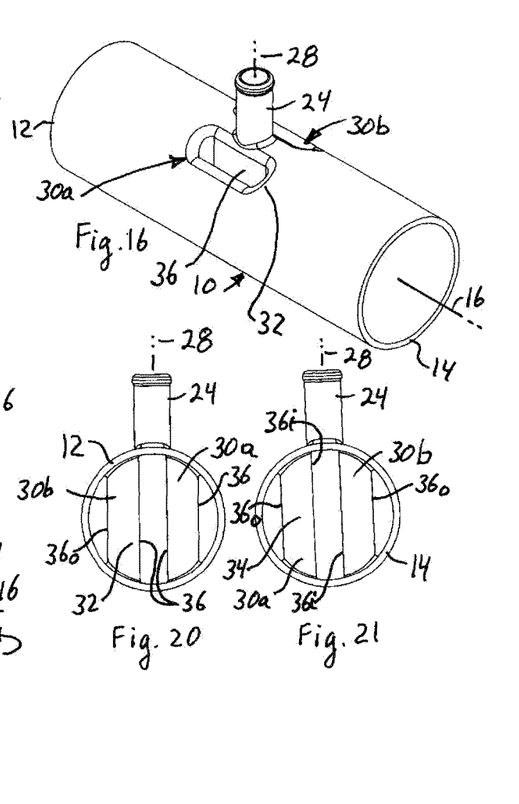
FIG. 16 is a perspective view of an embodiment showing a straight inlet tube with struts extending between and connecting to opposing walls of the tube where the struts have sides that are substantially parallel to each other and to the flow path.
FIG. 20 is a left side plan view of the tube of FIG. 18.
FIG. 21 is a right side plan view of the tube of FIG. 18.
Figure 17:
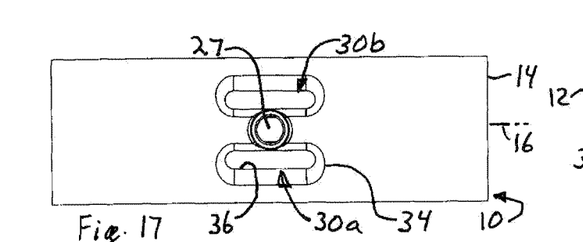
FIG. 17 is a top plan view of the tube of FIG. 16.
Figure 18:
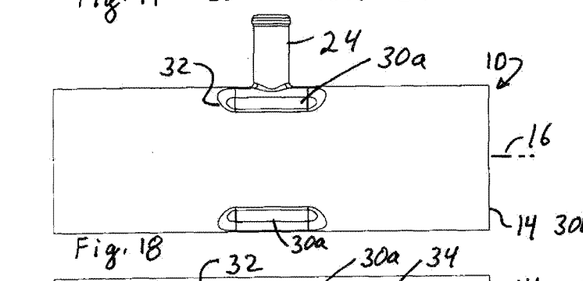
FIG. 18 is a side plan view of the tube of FIG. 17.
Figure 19:
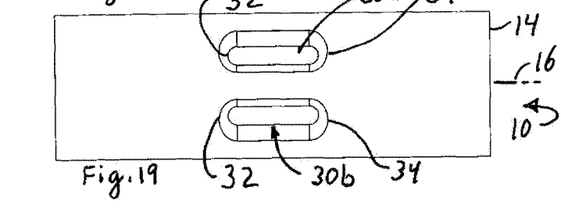
FIG. 19 is a bottom plan view of the tube of FIG. 17.

Referring to FIGS. 10-15, a straight, non-curved intake tube 10 is shown having struts 30a, 30b with flat sides 36. As seen in FIGS. 11-13, the struts extend between opposing walls of the tube 10 and form a hollow passage through the center of each strut. In this embodiment the hollow passage extends through both opposing sides of the wall of the tube 10 and opens onto an exterior side of the tube, as best seen in FIGS. 10-13. For ease of labeling and identification, the interior and exterior parts forming the struts 30 are given the same part number.

Referring to FIGS. 10-15, a straight, non-curved intake tube 10 is shown having struts 30a, 30b with flat sides 36. As seen in FIGS. 11-13, the struts extend between opposing walls or opposing sides of the wall the tube 10 and form a hollow passage through the center of each strut. Each strut 30 has a generally triangular-shaped cross section with a rounded leading and trailing edge, with the rounded leading edge having a much larger curvature than the trailing edge 32. In this embodiment the hollow passage extends through opposing sides of the wall forming the tube 10 as best seen in FIGS. 10-13. For ease of labeling and identification, the interior and exterior parts forming the struts 30 are given the same part number.

Referring to FIGS. 16-21, a straight, non-curved intake tube 10 is shown having struts 30a, 30b with flat and substantially parallel sides 36. By substantially parallel the sides 36 are within about six to eight degrees inclusive angle of being parallel. The struts extend between opposing sides of the wall forming the tube 10 and form a hollow passage through the center of each strut. In this embodiment the hollow passage extends through both opposing sides of the wall forming the tube 10 as best seen in FIGS. 16-19. For ease of labeling and identification, the interior and exterior parts forming the struts 30 are given the same part number. The opposing sides 36 of each strut 30 are substantially parallel and parallel to the flow path along centerline 16, and the leading and trailing edges 32, 34 have about the same radius of curvature.

Figures 22, 23, 24, 25, 26, 27:
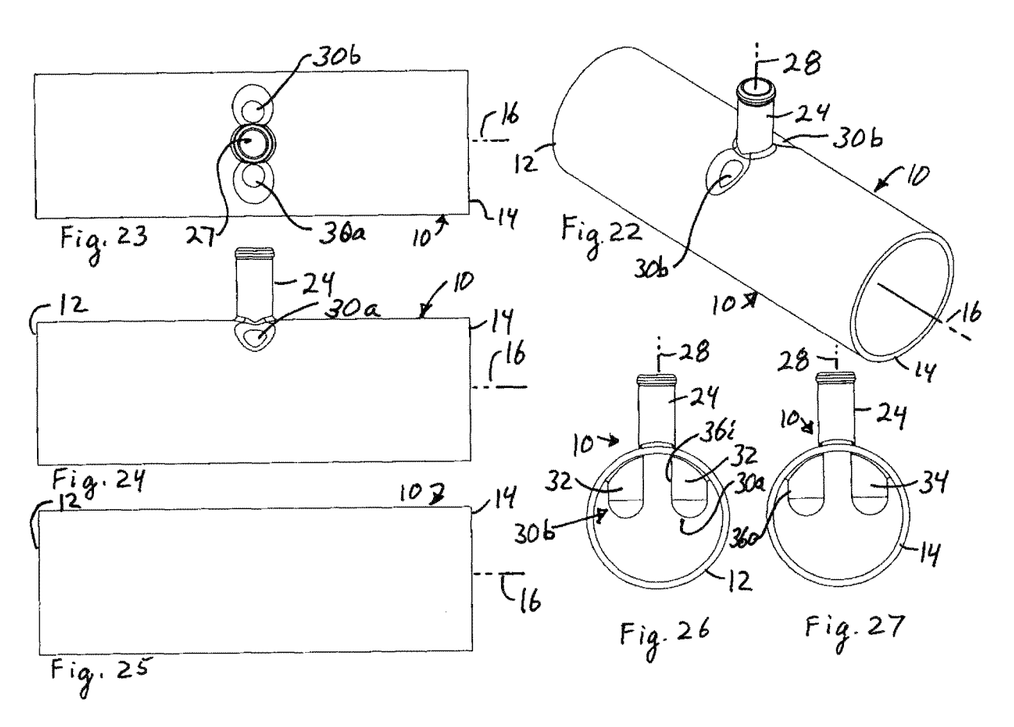
FIG. 22 is a perspective view of an embodiment showing a straight inlet tube with struts extending part way into the inlet tube.
FIG. 23 is a top plan view of the tube of FIG. 22.
FIG. 24 is a side plan view of the tube of FIG. 23.
FIG. 25 is a bottom plan view of the tube of FIG. 24
FIG. 26 is a left side plan view of the tube of FIG. 24.
FIG. 27 is a right side plan view of the tube of FIG. 24.
Figure 28:
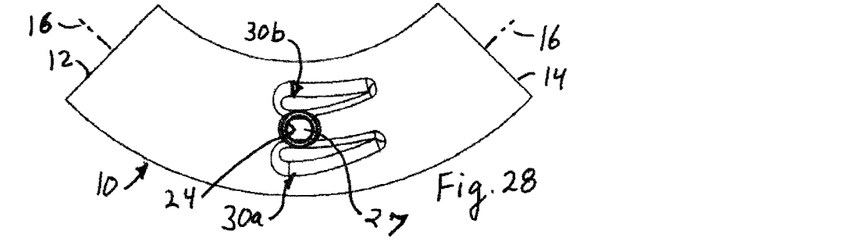
FIG. 28 is a top plan view of an generally planar intake tube curved in a lateral plane with struts at the curve.
Figure 29:
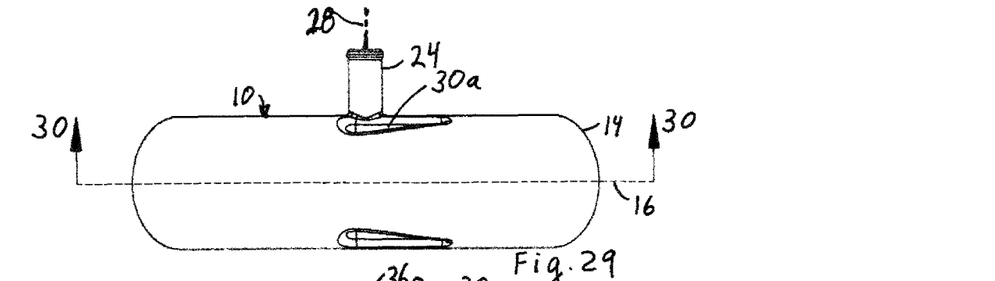
FIG. 29 is a side plan view of the intake tube of FIG. 28.

Referring to FIGS. 22-27, a straight, non-curved intake tube 10 is shown forming a generally cylindrical tube. The tube 10 has a having struts 30a, 30b with a circular cross-sectional shape with curved leading and trailing edges 32, 34, and either no flat sides or curved sides as the leading and trailing edges join each other. As seen in FIGS. 11-13, the struts 30 extend along a straight line toward the wall of the tube 10 and form a hollow passage through the center of each strut. In this embodiment the strut ends shortly before the centerline 16 forming a dead-ended, interior hollow in the strut as best seen in FIGS. 22, 26-27. Each strut 30 is shown with a curved, domed end. While the struts 30 are shown extending less than half way across the passage formed by the tube 10 the struts may extend any distance across the passage formed by the tube. The struts 30 are thus cantilevered off one side of the intake tube 10. The cantilevered struts 30 thus extend from one side of the tube 10 toward the opposing side and terminate in the interior of the tube, with varying performance in terms of maintaining the low pressure at the opening 27.

In the above embodiments, the connector fitting 24 and its associated opening 27 in the wall of the intake tube 10 are located between the struts 30a, 30b, with the struts being configured to alter the velocity of flow through the tube 10 to control the pressure at the entrance opening 27 to the connector fitting 24, preferably while also reducing the pressure loss or decrease in flow caused by the path blockage that arises from inserting the struts 30 into the flow path through the tube 10. The struts 30*a*, 30*b* are substantially parallel, within a few degrees, to help achieve the pressure and velocity control of the flow through the tube. To reduce the blockage and resulting pressure loss caused by the struts 30, the leading or upstream end 32 is preferably curved, as is the trailing or downstream end 34, although flat surfaces inclined along the direction of flow may be used but with some increase in pressure. A substantial flat surface orthogonal to the flow parallel to or along centerline 16 is to be avoided, as are surfaces that increase blockage of flow without contributing to reduction in pressure loss or increasing flow in desired locations adjacent fitting 24 and opening 27. As reflected by the drawings and description, the configuration of the struts 30 will vary, as will the location of the struts within the tube 10. FIGS. 1-8 show the struts 30 adjacent the downstream end 14 while FIGS. 10-27 show the struts 30 closer to the inlet end 12 of the tube 10 than in FIGS. 1-8.

By extending the struts 30 between and connected to opposing sides of the wall forming the tube 10 the struts may be structurally stronger than cantilevered connections. The hollow interior of the struts 30 may terminate in a blind end as in the configuration of FIGS. 7-8, or it may extend entirely through the wall forming tube 10 as in FIGS. 10-21. The tubes 10 with the struts 30 and fitting 24 are preferably simultaneously molded to form a unitary structure. Rotational molding is believed suitable. The configuration of the struts and hollow centers of the struts are configured to allow molding plugs to be inserted and/or removed for molding and thus the parts may have various tapers of 1-2° for molding.

Figure 30:
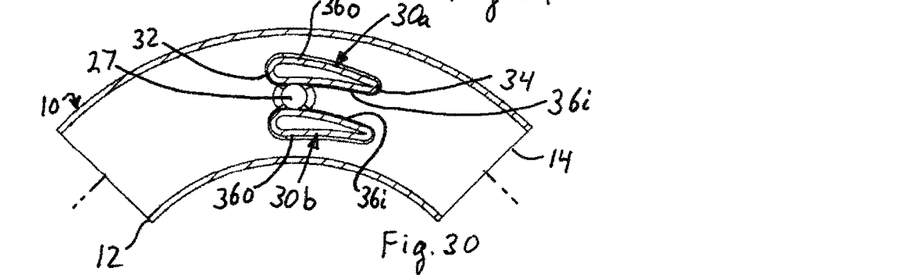
FIG. 30 is a section taken along 30-30 of FIG. 29.
Figure 31:
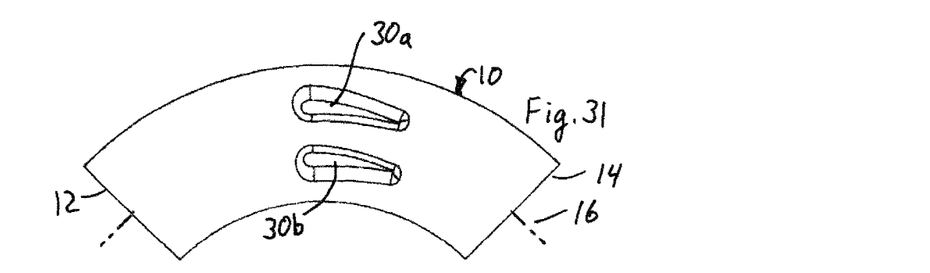
FIG. 31 is a bottom plan view of the intake tube of FIG. 28.

Referring to FIGS. 28-31 and especially FIG. 30, the centerline 16 of the intake tube 10 may be generally planar with the tube 10 curved. The tube 10 preferably has a circular cross-section but could be tapered in diameter. The inside curved wall and the outside curved wall of the tube 10 have a common center of curvature, but different radii of curvature. The struts 30 are also curved along the centerline 16. In the depicted embodiment the strut on the inside of the curve is strut 30*b*, while strut 30*a* is on the outside of the curve. Curvature in the opposing direction would reverse the inner and outer struts. For the depicted curvature, the inside strut 30*b* is slightly shorter in width measured in the downstream direction of flow along centerline 13, while the outside strut 30*a* is slightly longer in width measured in the downstream direction. The sides 36 of each strut are curved rather than straight as shown in the other embodiments. Each strut 30*a*, 30*b* has a concave side and a convex side, but all sides 36 are concave and curve in the same general direction as the inside curve of the wall of tube 10. The side of each strut 30*a*, 30*b* on the outward facing side of each strut preferably has the same radius of curvature Ro and the side of each strut 30*a*, 30*b* on the inward facing side of each strut preferably has the same radius of curvature Ri, with Ro being greater than Ri. Thus, each strut 30*a*, 30*b* has one side 36 with radius of curvature Ri and one side 36 with a radius of curvature Ro. Each strut 30*a*, 30*b* has one concave surface (facing the inside curve of tube 10) and each strut has one convex surface facing the outside curve of tube 10).

The radius of curvature Ri is shown as larger than the radius of curvature of the outside curve of the tube 10. The radius of curvature Ro is preferably about the same as or slightly larger than the radius of curvature of the outside curve of the tube 10. Depending on the specific design, these relative curvatures may vary.

The leading edges 32 of each strut 30 are closer together than the downstream edges 34 of each strut 30 so the downstream portions of the struts diverge in the downstream direction of flow along centerline 16. The increase in distance between the ends 34 of each strut (in the downstream direction) helps create a low pressure area that increases the velocity of the airflow. The leading edge 32 of each strut is closer to the adjacent wall of the tube 10 than the downstream edge 34 of that same strut, causing the distance between the side 36 of each strut and the adjacent wall of the tube 10 to increase in the direction of flow along centerline 16. The increase in distance between the ends 34 of each strut and the adjacent wall of tube 10 (in the downstream direction) helps create a low pressure area that increases the velocity of the airflow.

The opening 27 is located between the two struts 30 at the upstream or leading end of the struts. Advantageously the beginning of the opening 27 is at the nearest approach of the adjacent leading ends 34 of the struts 30 34. Downstream of this smallest spacing between the leading ends of the struts 30 the struts 30 separate slightly creating a lower pressure that increases the localized velocity of the airflow and reduces pressure.

While the above description uses two generally parallel struts, more than two struts could be used with an opening 27 located between each of two adjacent struts. The number of struts would be limited by the size of the openings 27 and the size of the tube 10 across which the struts 30 extend, given that the struts must be sufficiently stiff so that they do not break or move sufficiently during use to disrupt the airflow past the struts. If a larger number of struts are desired then the intake tube 10 may be configured to accommodate such struts, as for example, by having an elongated cross-sectional shape (e.g., rectangular or oval) to accommodate more struts 30.

The struts 30*a*, 30*b* may thus diverge along the direction of fitting axis 28 with the struts 30 closer together at the end of the struts closer to opening 27 and further apart at the end opposing opening 27. As best seen in FIGS. 7 and 8, the distance "i" (for inner or inside) between facing portions of the struts 30*a*, 30*b* at the inside curve of the tube 10 is smaller than the distance "o" (for outer or outside) between the facing portions of the struts 30*a*, 30*b* at the opposing, outer curve of the tube 10. Thus, the distance "o" is greater than the distance "i" (FIG. 8). A divergence of about 2 degrees on each strut is believed preferably, for a combined divergence of about 4 degrees.

The connector fitting 24 is shows extending generally radially to the wall of the intake tube 10 and orthogonal to the centerline 16, so the opening 27 is circular in cross section when viewed along fitting axis 28. But the connector fitting 24 could enter at an angle, preferably aligned with the direction of the flow of air through the tube 10 at the location of the opening 27. Inclined fittings 24 having an oval shape when viewed along the fitting axis 28 are believed suitable.

The above description is given by way of example, and not limitation. Given the above disclosure, one skilled in the art could devise variations that are within the scope and spirit of the invention disclosed herein, including various ways of configuring the struts to achieve a desired pressure drop between the struts and pressure drop in the tube in which the struts are located. Further, while the struts are described for use in an air inlet tube of a motor vehicle to control the pressure at hose opening (e.g., 27) located between the struts, the design may be used in other applications and the pressure at hose opening may be positive or negative. Additionally, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An air inlet for a turbocharger for a motor vehicle engine, comprising:
a tube forming the air inlet, the tube having upstream and downstream ends with a curve adjacent the downstream end, the curve forming an inside curve and an outside curve on opposing sides of the tube, the tube having a wall defining the tube and a centerline with the wall and centerline each having a curved portion at the curve;
first and second spaced apart struts each extending in a plane generally orthogonal to the centerline and between and connecting to the inside curve and the outside curve of the air inlet tube, each strut located on an opposing side of the curved portion of the centerline and separated from an adjacent wall of the inlet tube in a direction generally perpendicular to the centerline, each strut having an upstream edge larger than a downstream edge and configured to separate air flow through the tube into a first flow path between the struts and along the centerline, a second flow path between the first strut and the wall of the inlet tube adjacent the first strut and a third flow path between the second strut and the wall of the inlet tube adjacent the second strut, the first and second struts configured to increase the velocity of air flowing along at least the first flow path between the struts; and
a connector fitting having an opening in fluid communication with the inside of the inlet tube at a location that is between the first and second struts and adjacent the upstream edge of the struts and a wall of the tube to which the struts are connected so that the increase in velocity along the first flow path causes a reduction in pressure at the opening of the connector fitting.

2. The air inlet of claim 1, wherein the upstream edge of each strut comprises a curved surface with an upstream apex with the curved surface extending downstream from that apex and wherein the trailing edge of each strut comprises a curved surface with a downstream apex.

3. The air inlet of claim 1, wherein the cross-sectional shape of each strut is an oval with straight sides connecting the upstream and downstream edges, the oval shape extending along substantially an entire length of each strut.

4. The air inlet of claim 1, wherein each strut is configured to increase the velocity of airflow as it passes along the second and third flow paths parallel to the centerline.

5. The air inlet of claim 4, wherein the cross-sectional shape of each strut is an oval with straight sides connecting the upstream and downstream edges, the oval shape extending along substantially the entire length of each strut.

6. The air inlet of claim 1, wherein the opening to the connector fitting has a majority of the opening located between the struts and downstream of the upstream edge of the struts.

7. The air inlet of claim 1, wherein the connector fitting has an inner diameter Di and the struts have facing sides spaced apart a distance between about Di and 1.5 Di.

8. The air inlet of claim 5, wherein each upstream edge has a maximum thickness adjacent the leading edge of the strut and wherein the opening of the connector fitting has an upstream edge between the part of each strut having that maximum thickness.

9. The air inlet of claim 1, wherein the connector fitting is connected to a hose in fluid communication with a motor vehicle crankcase.

10. An air inlet for a turbocharger for a motor vehicle engine, comprising:
a tube forming the air inlet, the tube having upstream and downstream ends joined by a wall defining a flow path and having a centerline;
first and second struts spaced apart from each other and each extending from a first side of the tube along a straight length of each strut toward an opposing side of the tube in a plane generally orthogonal to the centerline, each strut located on an opposing side of the centerline and separated from an adjacent wall of the inlet tube in a direction generally perpendicular to the centerline, each strut having an upstream edge and a downstream edge and configured to separate air flow through the tube into a first flow path between the struts, a second flow path between the first strut and the wall of the inlet tube adjacent that one strut and a third flow path between the other strut and the wall of the inlet tube adjacent the other strut, the struts having a maximum thickness adjacent the upstream edge and a smaller thickness at the downstream edge to increase the velocity of airflow along the first flow path between the struts at the wall between the struts; and
an opening in the wall between the first and second struts, the opening in fluid communication with an inlet fitting extending outward from the tube.

11. The air inlet of claim 10, wherein each strut extends a length L which is shorter than the distance to the opposing wall of the tube so that each strut is cantilevered from the wall of the tube from which the strut extends.

12. The air inlet of claim 11, wherein each strut does not extend past the centerline of the tube.

13. The air inlet of claim 11, wherein each strut has a circular cross section.

14. The air inlet of claim 10, wherein each strut extends between and is connected to opposing sides of the wall of the tube.

15. The air inlet of claim 14, wherein each strut is hollow and opens onto an exterior surface of the tube at each opposing end of the tube.

16. The air inlet of claim 14, wherein each strut has a upstream edge curved in the direction of airflow along the centerline and a downstream edge curved in the opposing direction, both curved edges being joined by flat sides.

17. The air inlet of claim 16, wherein the upstream edge is larger than the downstream edge.

18. The air inlet of claim 14, wherein the centerline is curved and the corresponding part of the tube is also curved having an inner curved wall with a first radius of curvature and an outer curved wall with a second, larger radius of curvature, and wherein the first strut has the upstream edge curved in the direction of flow along the centerline and has a concave side facing the wall of the tube adjacent that concave side and facing toward the inner curve, the first strut having an opposing side that is convex and that joins the upstream edge and the trailing edge, and wherein the second strut has the upstream edge curved in the direction of flow along the centerline and has a convex side facing the wall of the tube adjacent that concave side and facing the outer curve, the second strut having an opposing side that is concave and that joins the upstream edge and the trailing edge of the second strut.

19. The air inlet of claim 16, wherein each strut has the upstream edge curved in the direction of flow along the centerline and sides joining a downstream edge.

20. The air inlet of claim 16, wherein each strut has an oval shaped cross-section with the upstream edge that larger than the downstream edge.

21. The air inlet of claim 16, wherein the upstream and downstream edges are joined by flat sides that are substantially parallel to each other.

22. The air inlet of claim 14, wherein sides connect the upstream and downstream edges with the sides of each strut connecting the upstream edge at a juncture extending along a length of the strut, a cross-sectional area of the first flow path in a plane through the junctures of facing sides the first and second struts being smaller than a cross-sectional area of the first flow path at the trailing edges of the first and second struts.

23. The air inlet of claim 22, wherein the cross-sectional area of the second flow path along the juncture of the first strut and the adjacent wall of the tube is larger than the cross-sectional area between the trailing edge of the first strut and the adjacent wall of the tube.

24. The air inlet of claim 22, wherein the struts are configured to increase the velocity of air passing downstream of the juncture and before the air passes the trailing edges of the struts.

25. The air inlet of claim 22, wherein the opening has a diameter Di and the first and second struts are spaced apart a distance between about Di at the location of the juncture of each strut.

26. The air inlet of claim 1, wherein the struts have an oval-shaped cross section.

* * * * *